US007846279B2

(12) United States Patent
Oh et al.

(10) Patent No.: US 7,846,279 B2

(45) Date of Patent: Dec. 7, 2010

(54) LOW PROFILE PASSIVE STATIC CONTROL DEVICE

(75) Inventors: Hieyoung W. Oh, Bowdoin, ME (US); Jeffrey W. Richarson, Otisfield, ME (US)

(73) Assignee: Illinois Tool Works Inc., Glenview, IL (US)

( * ) Notice: Subject to any disclaimer, the term of this patent is extended or adjusted under 35 U.S.C. 154(b) by 1508 days.

(21) Appl. No.: 11/040,975

(22) Filed: Jan. 21, 2005

(65) Prior Publication Data

US 2005/0145125 A1 Jul. 7, 2005

Related U.S. Application Data

(60) Division of application No. 10/435,872, filed on May 12, 2003, now Pat. No. 6,952,555, which is a continuation-in-part of application No. 10/017,779, filed on Dec. 13, 2001, now Pat. No. 6,647,242.

(60) Provisional application No. 60/401,448, filed on Aug. 6, 2002.

(51) Int. Cl.

| | |
|---|---|
| ***B29C 65/50*** | (2006.01) |
| ***B29C 65/52*** | (2006.01) |
| ***B29C 65/72*** | (2006.01) |
| ***H05F 3/00*** | (2006.01) |

(52) U.S. Cl. ........................ 156/72; 156/293; 156/298; 361/221; 271/208

(58) Field of Classification Search .................. 156/72, 156/293, 297, 298; 300/21; 361/221; 271/208

See application file for complete search history.

(56) References Cited

U.S. PATENT DOCUMENTS

| | | | | |
|---|---|---|---|---|
| 4,352,143 | A * | 9/1982 | Uno | 361/221 |
| 6,048,119 | A * | 4/2000 | Kato et al. | 400/624 |
| 6,252,757 | B1 * | 6/2001 | Loughney et al. | 361/221 |

FOREIGN PATENT DOCUMENTS

| | | |
|---|---|---|
| JP | 10125490 | 5/1998 |

* cited by examiner

*Primary Examiner*—Michael A Tolin

(74) *Attorney, Agent, or Firm*—Taylor IP, P.C.

(57) ABSTRACT

A static control device suitable for printers, copiers and the like is disclosed with a manufacturing method therefor. A carrier strip of non-metallic, electrically conductive material, such as plastic, is provided with a plurality of spaced bundles of electrically conductive filaments. The bundles extend beyond the carrier strip, in close proximity to media transported along a media path. In the presence of electrical fields, the filaments induce ionization, and establish a conductive path for charges on the media to the carrier strip for grounding. A strand is attached across the bundles, for improving the structural integrity of the device.

3 Claims, 3 Drawing Sheets

LOW PROFILE PASSIVE STATIC CONTROL DEVICE

CROSS-REFERENCE TO RELATED APPLICATIONS

The present application claims benefit to U.S. Provisional Application Ser. No. 60/401,448 filed Aug. 6 2002, and is a divisional of U.S. Application Ser. No. 10/435,872 filed May 12, 2003, now U.S. Pat. No. 6,952,555, which is a continuation-in-part of U.S. application Ser. No. 10/017,779 filed Dec. 13, 2001, now U.S. Pat. No. 6,647,242.

FIELD OF THE INVENTION

The present invention relates to static control devices in media handling systems, such as printers and copiers; and, more specifically, the invention relates to static control devices utilizing fine fiber bundles and non-contact ionization for static charge dissipation.

BACKGROUND OF THE INVENTION

In a commonly used process for electrophotographic printing applications, such as for printers and copiers, a uniform charge is applied to a photoconductive surface on a drum or belt. A light beam, such as from a laser, is used to expose the surface, leaving an electrostatic latent image corresponding to the image to be printed. The latent image is developed by the application of toner particles that adhere to the electrostatic latent image. The toner image is transferred to the media intended to receive the printed image, and the toner image subsequently is fixed to the media through the application of heat and/or pressure in a fuser.

In printers, copiers, and other machines having sheet handling pathways, electrical charges can build up in media, such as paper, that is transported through the machine. The media transported through such a device, both before and after reception of the toner image thereon, is frictionally contacted by numerous rotating members, and is slid along, over and against various stationary guide members. Consequently, the media can accumulate both positive and negative electric charges, both as a result of transport through the machine and from transfer of chargers in the electrophotographic process. Paper will typically accept and hold such charges readily.

Machine performance and function are adversely impacted by the buildup of charges in the media. Charges in the media can cause the media to be attracted to or repelled from transport surfaces, interfering with proper transport and indexing of the media for proper printing. Charges in the media also can interfere with transfer of the toner image to the media surface, by attracting stray toner particles thereto, in areas of the sheet not intended to receive a toner image. Such charges also can cause sheets to attract each other, causing media jams in the machine.

Thus, it is desirable to remove the electrostatic charges from the sheet. It is known to use devices to ionize air surrounding the sheet, thereby providing a pathway to ground. It is also known to contact the sheet directly with conductive strips, providing a more physically continuous grounding path for charges on the sheet. Early known ionizing devices where expensive and produced ozone, and contacting devices sliding over a newly formed image on a sheet transported through the machine degraded the image quality. Thus, neither of these designs was completely satisfactory.

It also is known to contact the sheet with conductive brushes having fibers secured in a matrix. For example, it is known from U.S. Pat. No. 5,354,607 "FIBRILLATED PULTRUDED ELECTRONIC COMPONENT STATIC ELIMINATOR DEVICES" to form pultrusions from densely packed bundles of fibers. One end of the bundle is fibrillated, and the exposed ends thereof contact a surface to be discharged. Other types of both contacting and non-contacting brush-like static charge eliminators are known also.

In another known, brush-like static eliminator, a thin tape of aluminum foil is provided transverse to the paper path in a machine. A plurality of discrete bundles of individual electrically conductive fibers are adhered to the aluminum foil, and can contact or come in close proximity to the surface of a sheet transported along the path. A problem with this design is that aluminum foil can tear easily, and is difficult to apply on a machine in a straight line, which is necessary to maintain constant space from a sheet along the length of the device. It is also known to use an aluminum strip rather than foil. However, the aluminum strip has physical memory, and will tend to curve at the ends thereof, if the aluminum strip was ever provided or stored in a roll. Also, aluminum is subject to oxidation, which reduces the conductivity and increases the surface resistance. If oxidation is significant, the effectiveness of the static control device can be diminished.

Attempts at improving such devices have not met with total success. Using a non-conductor, such as polyester, in the support or carrier strip may eliminate memory problems, but requires incorporation of conductive structures for connecting the fiber bundles to a grounding source. A single fiber or a plurality of fibers running the length of the strip can be used as the conductive structure, but is subject to failure if the continuity thereof is broken. Providing a metal coating on a non-conductive base material to serve as the conductive structure is also effective electrically, but scratching can cause discontinuity and failure of the device.

Another problem has been encountered with such devices as machine architectures have become smaller. Smaller, lighter machines are desirable. To achieve this, frames are becoming increasingly thin and streamlined as machine profiles become smaller. Consequently, surfaces to which an anti-static device can be attached are becoming thinner, and narrower carrier strips are needed in the anti-static devices. Attachment of the very thin fibers to a narrow carrier strip has become problematic.

What is needed in the art is a rigidly backed static eliminator that has bulk conductivity and corrosion resistance, facilitates straight installation of the device in a printer, copier or the like and can be made relatively narrow for installation on thin surfaces.

SUMMARY OF THE INVENTION

The present invention provides a structure with reinforcement for the attachment of filament bundles to a conductive carrier strip, so the carrier strip can be made narrower.

In one aspect thereof, the present invention provides a static control device with a carrier strip of non-metallic, electrically conductive material. The strip has a length and first and second lateral edges extending along the length. At least one bundle of electrically conductive filaments is attached to the carrier strip, disposed on the strip transverse to the lateral edges and extending beyond at least one of the lateral edges. A strand is attached across the filaments with adhesive.

In another aspect thereof, the present invention provides a static control system for a media handling apparatus having frame members and conveying devices providing a media path for transporting sheets of media through the apparatus along the media path. A static control device includes a non-metallic conductive carrier strip. The carrier strip has a length and first and second lateral edges. The carrier strip is attached and electrically connected to the frame. At least one bundle of electrically conductive filaments is attached to the carrier strip, the at least one bundle of filaments being disposed on the strip transverse to the lateral edges, and extending beyond at least one of the lateral edges. A strand is attached across the filaments with adhesive.

In yet another aspect thereof, the present invention provides a static control system for a media handling apparatus with at least one frame member and conveying devices providing a media path for transporting sheets of media through the apparatus along the media path. A static control device includes a flexible, conductive plastic carrier strip, the carrier strip having a length and first and second lateral edges. The carrier strip is attached and electrically connected to the frame, and disposed transverse to media transported along the media path. A plurality of bundles of electrically conductive filaments are attached to the carrier strip, and disposed on the strip transverse to the lateral edges. The filaments have ends disposed in spaced relation to media transported along the media path. A strand extends along the length of the carrier strip, and is attached to the bundles and the carrier strip with adhesive.

In a further aspect thereof, the present invention provides a method of manufacturing a static control device for a media handling apparatus with steps of providing a flexible, conductive plastic carrier strip having a length and first and second lateral edges; providing a plurality of bundles of electrically conductive filaments having diameters sufficiently small to induce ionization in the presence of an electrical field; providing a strand and an adhesive; positioning the bundles in spaced relation transverse to the lateral edges of the carrier strip, with ends of the filaments extending beyond at least one of the lateral edges; applying adhesive on the strand; placing the strand with adhesive thereon across the bundles; and fixing the adhesive and adhering the strand to the bundles and the carrier strip.

An advantage of the present invention is providing a static control device that is easy to install properly, and that is resistant to corrosion, staining and physical deterioration from contact with common cleaning materials.

Another advantage of the present invention is providing a static control device that is robust, and can withstand a degree of physical damage without compromising its operational effectiveness.

Yet another advantage of the present invention is to provide a static control device that is light weight to reduce shipping expense, has low physical memory to remain flat when installed even if it was previously stored in a roll, and that has smooth edges for increased safety in handling.

Other features and advantages of the invention will become apparent to those skilled in the art upon review of the following detailed description, claims and drawings in which like numerals are used to designate like features.

Figure 1:
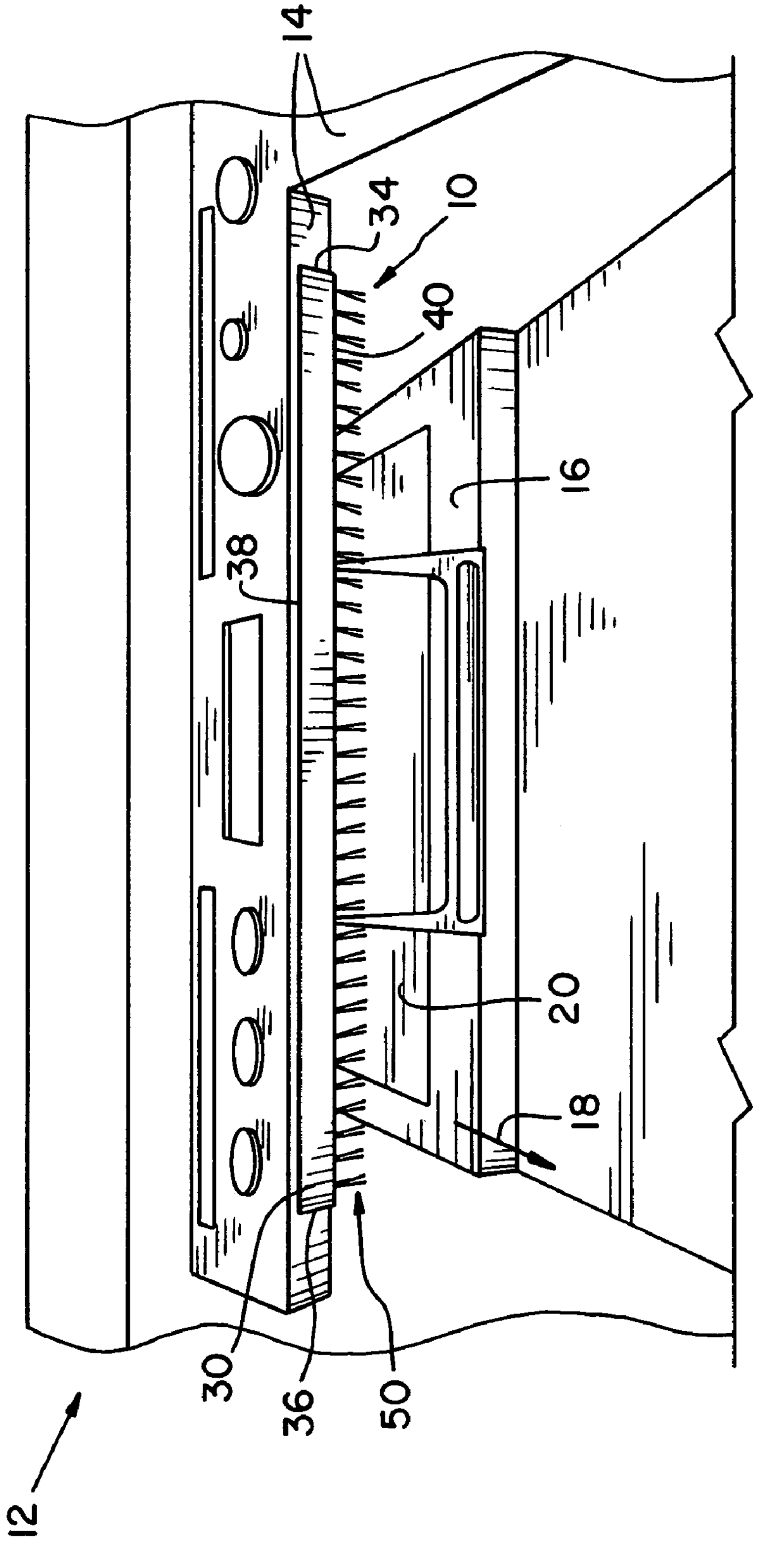
FIG. 1 is a fragmentary perspective view of a printer having a low profile passive static control device of the present invention.
Figure 2:
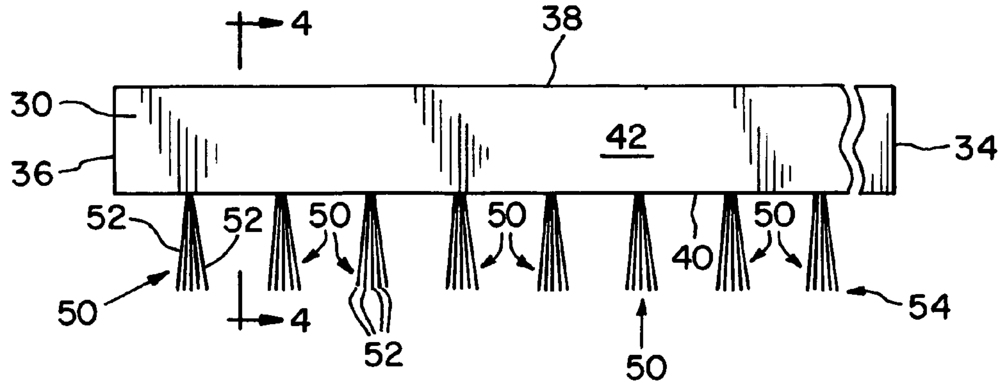
FIG. 2 is an elevational view of a first side of a segment of the low profile passive static control device of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of “including” and “comprising” and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a low profile passive static control device of the present invention provided in a media handling apparatus 12. Apparatus 12 may be a copier, printer, scanner or other device processing sheets of media, such as paper, for printing or scanning functions. As illustrated in FIG. 1, apparatus 12 is a printer. Static control device 10 operates advantageously in all types of apparatuses 12, including printers employing electrophotographic printing processes, and is particularly advantageous in a low profile apparatus 12.

Apparatus 12 includes a plurality of frame members 14, conveying devices 16 and other structural members defining a media path indicated by arrow 18, along which individual sheets of media 20, such as paper, are transported during the printing process. Static control device 10 is positioned relative to media transported along media path 18 to dissipate electrical charges that may have accumulated in the media. Static control device 10 is attached to a frame member 14 and is positioned transverse to the direction of travel of media 20 along media path 18. A particular advantage of static control device 10 of the present invention is that it is narrow, and can be applied to very thin or narrow frame members 14.

Figure 3:
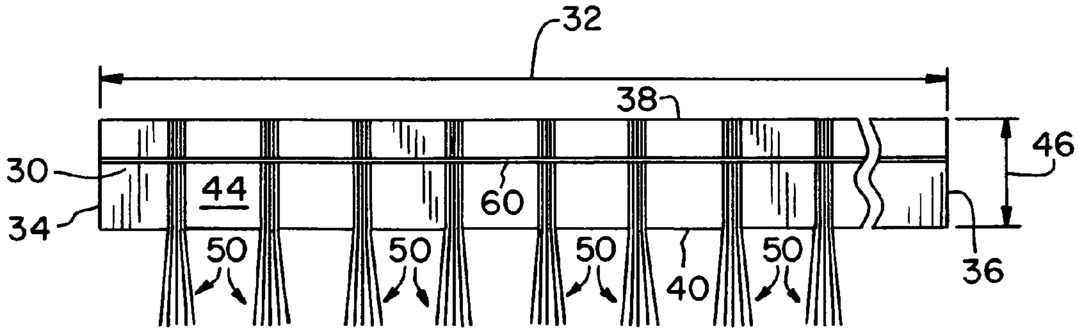
FIG. 3 is an elevational view of the low profile passive static control device, showing the side opposite the side shown in FIG. 2.

With reference now to FIGS. 2-7, static control device 10 includes a carrier strip 30, shaped as an elongated substantially rectangular body having a length indicated by line 32 in FIG. 3, between ends 34 and 36. Lateral edges 38 and 40 extend along length 32, from end 34 to end 36. Carrier strip 30 has a front surface 42 and a back surface 44. Carrier strip 30 further has a width indicated by line 46, which is the distance along ends 34 and 36, between lateral edges 38 and 40. The present invention facilitates the manufacture and improves the performance of static control devices 10 having narrow widths 46, and has been shown to be effective for widths 46 of about 5 millimeters.

Carrier strip 30 preferably is a flexible body of non-metallic conductive material, such as conductive plastic. Suitable material must provide acceptable surface and volume resistivity and heat resistance. Polycarbonate film is a suitable material for carrier strip 30, and one such polycarbonate marketed under the trade name BAYFOL® is available from Bayer Polymers Division, Bayer Corporation, 100 Bayer Road, Pittsburgh, Pa. 15205-9741. BAYFOL® as a film is an extruded anti-static film made from a blend of polycarbonate and polyester. Carbon black filler is included in the structure to provide anti-static properties. Carrier strip 30 is sufficiently flexible to accommodate various surface irregularities, but has sufficient stiffness in the transverse direction from lateral edge 38 to lateral edge 40 to facilitate straight line application of carrier strip 30 to frame member 14.

A plurality of bundles 50, each having a plurality of filaments 52, is provided along carrier strip length 32. Filaments 52 are very fine, hair-like structures, and can be made from carbon fiber, stainless steel fiber, conductive acrylic fiber or any conductive fiber type filament that can be provided with diameters sufficiently small to induce ionization when in the presence of an electrical field. In FIGS. 2 through 7, for ease in illustration, each bundle 50 is shown to have three to five filaments 52. However, it should be recognized that in most applications for low profile static control device 10, each bundle 50 will have many more filaments, and may include fifty or more filaments 52. Each filament 52 of bundles 50 is adhered directly or indirectly to carrier strip 30 in electrically conductive connection. Bundles 50 are secured to back surface 44 of carrier strip 30, and filaments 52 thereof each have a distal end 54 that extends substantially beyond lateral edge 40 of carrier strip 30.

To improve the integrity of static control device 10, and more specifically to improve the fixation of filaments 52 within static control device 10, a strand 60 is fixed across filament bundles 50, extending along length 32 from at or near end 34 to at or near end 36. In a preferred construction, strand 60 is at least sufficiently long to extend across all bundles 50. Strand 60 is coated with adhesive coating 62. During assembly of static control device 10, strand 60 can be drawn through a well or reservoir of adhesive, to absorb adhesive and deliver adhesive to individual filaments 52 of bundles 50. Some or all of the length of bundles 50 between lateral edges 38 and 40 can also be covered with adhesive, so that individual filaments 52 in bundles 50 are tightly bonded to carrier strip 30, strand 60 and/or adjacent filaments 52.

Adhesive coating 62 bonds securely to strand 60, filaments 52 and carrier strip 30. Polyurethane coatings have been found to work well for adhesive coating 62. A suitable polyurethane for use as adhesive coating 62 is MINWAX® Wipe-On Poly from Minwax Company. Another suitable adhesive is NACOR® 72-9904 acrylic adhesive from National Starch & Chemical Company.

Back surface 44 of carrier strip 30, strand 60 and those portions of bundles 50 exposed on back surface 44 are covered with a suitable contact adhesive layer 64. Contact adhesive layer 64 should be electrically conductive, to establish an electrical connection between carrier strip 30 and frame member 14 on which static control device 10 is installed. During transport and handling of static control device 10, a holding layer (not shown) of release material is provided to retain thereon carrier strip 30 and to protect filament bundles 50. Several lengths of static control devices 10 can be provided on a single holder layer, which should be of sufficient width to accommodate the width of carrier strip 30 and the length of fiber bundles 50 extending beyond carrier strip 30. Adhesive layer 64 releases from the holding layer, and is used to secure static control device 10 to frame member 14.

Adhesive layer 64 can be in the nature of double-sided tape that can be adhered to the exposed surfaces of carrier strip 30, filament bundles 50 and strand 60. As those skilled in the art will understand readily, such double sided tape is normally provided with a protective disposable strip that is removed just prior to application of static control device 10.

Figure 4:
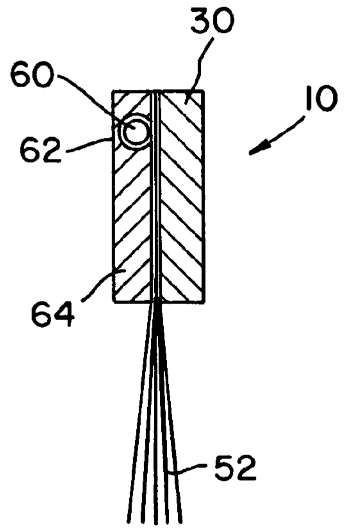
FIG. 4 is a cross sectional view of the low profile passive static control device shown in FIG. 2, taken along line 44 of FIG. 2.
Figure 5:
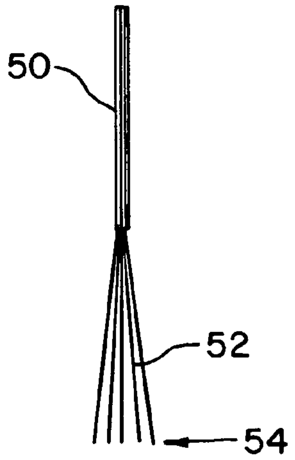
FIG. 5 is an elevational view of a filament bundle used in the low profile static control device of the present invention.
Figure 6:
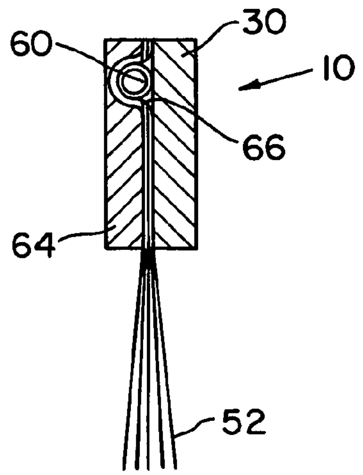
FIG. 6 is a cross sectional view similar to that of FIG. 4, but illustrating a second embodiment of the present invention.

As illustrated in FIG. 4, filament bundles 50 are sandwiched between a flat surface of carrier strip 30 and strand 60. Further improvements can be realized by embedding filament bundles 50 in a depression, with strand 60 wedging or pinching the bundles 50 into the depression. In FIG. 6, strand 60 is disposed against carrier strip 30, and bundles 50 are wedged into a depression or depressions 66 in adhesive layer 64. Pressure exerted on the assembled sandwich of carrier strip 30, bundles 50, strand 60 and adhesive layer 64 causes adhesive layer 64 to conform to the surfaces against which it is pressed. Bundles 50 are locked in position as shown in FIG. 6.

Figure 7:
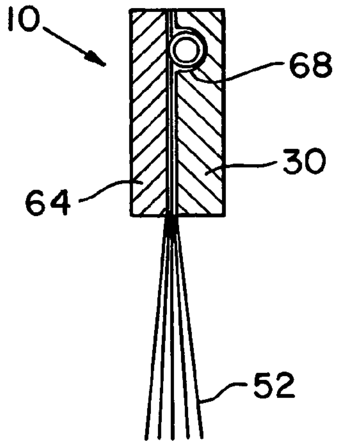
FIG. 7 is cross sectional view similar to that of FIG. 4, but illustrating another embodiment of the present invention.

In still another construction illustrated in FIG. 7, carrier strip 30 is provided with a depression of depressions in the way of a channel or channels 68, and bundles 50 are wedged into channel 68 by strand 60 partially embedded in channel 68. Channel 68 can extend length 32 of carrier strip 30, or can be a series of short channels or notches in the locations for bundles 50 on carrier strip 30. Channel or channels 68 can be formed during extrusion or thermoforming of carrier strip 30, or can be formed by machining or pressing the formed carrier strip 30. As yet another alternative, heat can be applied with pressing to embed bundles 50 and strand 60 into carrier strip 30. The dimension of channel 68 should be controlled so that bundles 50 and strand 60 are received tightly therein.

Filament bundles 50 and individual filaments 52 thereof are similar to filaments and bundles used in previous static control devices using aluminum strip material as the carrier piece. However, unlike aluminum strips, the conductive plastics of the present invention do not possess physical memory sufficient to cause curling at ends 34 and 36, even if carrier strip 30 is supplied or stored in rolls. Further, the conductive plastic of carrier strip 30 is not subject to oxidation, and the functional properties of carrier strip 30 do not degrade from oxidation. Water and other common cleaning materials used for printers, copiers and the like do not adversely impact carrier strip 30. Since the conductivity of carrier strip 30 is consistent throughout its length, width, and thickness scratches or other mars on front surface 42 or back surface 44 do not adversely affect the conductivity of carrier strip 30 significantly. Carrier strip 30 is lightweight, reducing expense for shipping. Further, as compared with prior structures employing metallic strips, carrier strip 30 of the present invention is smooth and has soft edges, eliminating potential cuts or scratches to assemblers handling the carrier strip. Carrier strip 30 is also resistant to staining and other corrosion from common cleaners that may be used, and from moist environments in which the media handling apparatus 12 may be installed. The flexibility of the conductive plastic allows strip 30 to follow the contour of the surface on frame member 14, thereby providing excellent conductivity from filaments 52 to carrier strip 30 and to frame member 14 through which grounding occurs. The rigidity of carrier strip 30, particularly between lateral edges 38 and 40, facilitates alignment of carrier strip 30 in device 10, and application in a desired straight line along frame member 14, particularly as compared with aluminum foils and fiber cloth products used in prior static control devices. The use of strand 60 and adhesive coating 62 improves the adherence of filaments 52 within the structure, and wedging filament bundles 50 in a depression 66 or channel 68 with strand 60 provides even greater structural integrity.

In the use and operation of static control device 10 according to the present invention, carrier strip 30 is obtained in sufficient length 32 to extend across the width of media path 18. Length 32 can be cut from a longer supply of static control device 10, which may be provided in a roll or coil. Lateral edge 40 is positioned parallel to media path 18, such that ends 54 of filaments 52 are spaced appropriately from media sheet 20 being transported along media path 18. Frame member 14 is provided along media path 18 and carrier strip 30 is attached to frame member 14 by proper positioning of carrier strip 30 and application of pressure with adhesive layer 64 against frame member 14. Carrier strip 30 is thereby adhered to frame member 14 in electrically conductive fashion such that electrical chargers received by carrier strip 30 are transmitted to frame 14 and the grounding path of media handling apparatus 12. Bundles 50 are positioned in close proximity to, but need not contact media transported along media path 18, as those skilled in the art will understand readily. As an electrical field generated by charges contained in the media encounters filaments 52, an ionized field is created, allowing the transfer of charges from the media sheet to bundles 50 and carrier strip 30. As a result of the electrically conductive path created by adhesive layer 64, and between carrier strip 30 and frame member 14, positive and negative charges are conducted to ground through the grounding circuit of media handling apparatus 12.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method of manufacturing a static control device for a media handling apparatus comprising:

providing a flexible, conductive plastic carrier strip, the carrier strip having a length and first and second lateral edges;

providing a plurality of bundles of electrically conductive filaments having diameters sufficiently small to induce ionization in the presence of an electrical field;

providing a strand and an adhesive;

providing an adhesive strip;

creating a depression in one of the adhesive strip and the carrier strip;

positioning the bundles in spaced relation transverse to the lateral edges of the carrier strip, with ends of the filaments extending beyond at least one of the lateral edges;

applying the adhesive to the strand;

placing the strand with adhesive thereon across the bundles and securing at least some of the filaments in the depression with the strand;

fixing the adhesive and adhering the strand to the bundles and the carrier strip; and applying the adhesive strip over the strand and bundles on a side opposite of the carrier strip.

2. A method of manufacturing a static control device for a media handling apparatus comprising:

providing a flexible, conductive plastic carrier strip, the carrier strip having a length and first and second lateral edges;

providing a plurality of bundles of electrically conductive filaments having diameters sufficiently small to induce ionization in the presence of an electrical field;

providing a strand and an adhesive;

creating a channel in the carrier strip the length of the strand;

positioning the bundles in spaced relation transverse to the lateral edges of the carrier strip, with ends of the filaments extending beyond at least one of the lateral edges;

applying the adhesive to the strand;

placing the strand with adhesive thereon across the bundles; and fixing the adhesive and securing the bundles of filaments in the channel between the carrier strip and the strand.

3. A method of manufacturing a static control device for a media handling apparatus comprising:

providing a flexible, conductive plastic carrier strip, the carrier strip having a length and first and second lateral edges;

providing a plurality of bundles of electrically conductive filaments having diameters sufficiently small to induce ionization in the presence of an electrical field;

providing a strand and an adhesive;

positioning the bundles in spaced relation transverse to the lateral edges of the carrier strip, with ends of the filaments extending beyond at least one of the lateral edges;

applying the adhesive to the strand;

placing the strand with adhesive thereon across the bundles;

pressing the strand over the bundles to embed the strand and a segment of each bundle into the carrier strip; and fixing the adhesive and adhering the strand to the bundles and the carrier strip.

* * * * *